US010047988B2

(12) United States Patent
Miyakoshi et al.

(10) Patent No.: US 10,047,988 B2
(45) Date of Patent: Aug. 14, 2018

(54) VEHICLE AIR CONDITIONER

(71) Applicant: Sanden Holdings Corporation, Isesaki-shi, Gunma (JP)

(72) Inventors: Ryo Miyakoshi, Isesaki (JP); Kenichi Suzuki, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 242 days.

(21) Appl. No.: 14/912,566

(22) PCT Filed: Aug. 21, 2014

(86) PCT No.: PCT/JP2014/071833
§ 371 (c)(1),
(2) Date: Feb. 17, 2016

(87) PCT Pub. No.: WO2015/025905
PCT Pub. Date: Feb. 26, 2015

(65) Prior Publication Data
US 2016/0201959 A1 Jul. 14, 2016

(30) Foreign Application Priority Data
Aug. 23, 2013 (JP) ................. 2013-173585

(51) Int. Cl.
*B60H 3/02* (2006.01)
*F25B 47/02* (2006.01)
(Continued)

(52) U.S. Cl.
CPC ....... *F25B 47/022* (2013.01); *B60H 1/00385* (2013.01); *B60H 1/00914* (2013.01);
(Continued)

(58) Field of Classification Search
CPC ............ F25B 31/008; F25B 2400/0409; F25B 2400/05
(Continued)

(56) References Cited

U.S. PATENT DOCUMENTS

2012/0255319 A1* 10/2012 Itoh ....................... F24F 3/1405
62/160

FOREIGN PATENT DOCUMENTS

JP S60-186660 A 9/1985
JP S62-225865 A 10/1987
(Continued)

OTHER PUBLICATIONS

Translation of JP2011152808.*
(Continued)

*Primary Examiner* — David Teitelbaum
*Assistant Examiner* — Paul Schwarzenberg
(74) *Attorney, Agent, or Firm* — Baker Botts L.L.P.

(57) ABSTRACT

There is disclosed a vehicle air conditioner in which in a dehumidifying and heating mode, a heating capability by a radiator can be acquired while avoiding frost formation to a heat absorber. A dehumidifying and heating mode is executed in which a refrigerant discharged from a compressor 2 radiates heat in a radiator 4, the refrigerant by which heat has been radiated is decompressed, and then heat is absorbed in a heat absorber 9 and an outdoor heat exchanger 7 or only in the heat absorber 9 to heating a vehicle interior while dehumidifying the vehicle interior. The vehicle air conditioner includes an injection circuit 40 which distributes a part of the refrigerant flowing out from the radiator 4 to return the part to the compressor 2. In the dehumidifying and heating mode, a controller 32 operates the injection circuit 40 in a case where there is established a predetermined heating capability shortage condition on which a heating
(Continued)

capability runs short, a predetermined dehumidifying capability excess condition on which a dehumidifying capability becomes excessive or a predetermined low outdoor air temperature startup condition on which startup is made at a low outdoor air temperature.

7 Claims, 9 Drawing Sheets

(51) Int. Cl.
    *B60H 1/00*     (2006.01)
    *F25B 41/04*     (2006.01)
    *F25B 41/06*     (2006.01)
    *F25B 49/02*     (2006.01)
    *B60H 1/32*     (2006.01)
    *F25B 31/00*     (2006.01)
    *F25B 5/04*     (2006.01)
    *F25B 6/04*     (2006.01)
    *F25B 40/00*     (2006.01)

(52) U.S. Cl.
    CPC ....... *B60H 1/00921* (2013.01); *B60H 1/3223* (2013.01); *B60H 3/024* (2013.01); *F25B 31/008* (2013.01); *F25B 41/04* (2013.01); *F25B 41/043* (2013.01); *F25B 41/062* (2013.01); *F25B 49/022* (2013.01); *B60H 2001/00957* (2013.01); *B60H 2001/3258* (2013.01); *F25B 5/04* (2013.01); *F25B 6/04* (2013.01); *F25B 40/00* (2013.01); *F25B 2341/0662* (2013.01); *F25B 2400/0409* (2013.01); *F25B 2400/0411* (2013.01); *F25B 2400/05* (2013.01); *F25B 2600/0253* (2013.01); *F25B 2600/2513* (2013.01); *F25B 2700/195* (2013.01)

(58) Field of Classification Search
    USPC ...................................................... 62/228.3
    See application file for complete search history.

(56) References Cited

FOREIGN PATENT DOCUMENTS

| | | |
|---|---|---|
| JP | H01-121650 A | 5/1989 |
| JP | 2001-116373 A | 4/2001 |
| JP | 2002-130770 A | 5/2002 |
| JP | 3985384 B2 | 10/2007 |
| JP | 2009-243793 A | 10/2009 |
| JP | 2011152808 A * | 8/2011 |
| JP | 2012-176660 A | 9/2012 |
| JP | 2012-233676 A | 11/2012 |
| JP | 2013-002710 A | 1/2013 |
| JP | 2013-095347 A | 5/2013 |
| WO | 2013/084738 A1 | 6/2013 |
| WO | 2013/121844 A1 | 8/2013 |

OTHER PUBLICATIONS

The State Intellectual Property Office of People's Republic of China, First Office Action for Chinese Application No. 201480046763.8, dated Dec. 15, 2016.
Japan Patent Office, Second Notification of Reasons for Refusal for Patent Application No. JP 2013-173585, dated Aug. 1, 2017.
Japan Patent Office, First Notification of Reasons for Refusal for Patent Application No. JP 2013-173585, dated Jun. 6, 2017.

* cited by examiner

P-h DIAGRAM

VEHICLE AIR CONDITIONER

CROSS-REFERENCE TO RELATED APPLICATIONS

This application is a U.S. National Stage Patent Application under 37 U.S.C. § 371 of International Patent Application No. PCT/JP2014/071833, filed on Aug.21, 2014,which claims the benefit of Japanese Patent Application No. JP 2013-173585, filed on Aug.23, 2013, the disclosures of which are incorporated herein by reference in their entirety.

TECHNICAL FIELD

The present invention relates to a vehicle air conditioner of a heat pump system which conditions air in a vehicle interior.

BACKGROUND ART

Due to actualization of environmental problems in recent years, hybrid cars and electric cars have spread. Furthermore, as an air conditioner which is applicable to such a vehicle, there has been developed an air conditioner which includes a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and a refrigerant circuit constituted of an outdoor heat exchanger disposed outside the vehicle interior to let the refrigerant radiate or absorb heat, and which changes and executes respective modes such as a heating mode in which the refrigerant discharged from the compressor radiates heat in the radiator and the refrigerant by which heat has been radiated in this radiator absorbs heat in the outdoor heat exchanger, a dehumidifying and heating mode in which the refrigerant discharged from the compressor radiates heat in the radiator and the refrigerant by which heat has been radiated in the radiator absorbs heat in the heat absorber and the outdoor heat exchanger or only in the heat absorber, a cooling mode in which the refrigerant discharged from the compressor radiates heat in the outdoor heat exchanger and absorbs heat in the heat absorber, and a dehumidifying and cooling mode in which the refrigerant discharged from the compressor radiates heat in the radiator and outdoor heat exchanger and the refrigerant absorbs heat in the heat absorber (e.g., see Patent Document 1).

Additionally, there has also been developed an air conditioner including an injection circuit which distributes the refrigerant flowing out from the radiator, decompresses this distributed refrigerant, performs heat exchange between this refrigerant and the refrigerant flowing out from the radiator, and then returns the refrigerant to the middle of compression by the compressor in the heating mode, whereby the refrigerant to be discharged from the compressor is increased, and a heating capability by the radiator improves (e.g., see Patent Document 2).

CITATION LIST

Patent Documents

Patent Document 1: Japanese Patent Application Publication No. 2012-176660
Patent Document 2: Japanese Patent No. 3985384

SUMMARY OF THE INVENTION

Problems to be Solved by the Invention

Here, a refrigerant flowing into an outdoor heat exchanger is decompressed by an outdoor expansion valve, the refrigerant is distributed before this outdoor expansion valve, decompressed and passed through a heat absorber, additionally, a number of revolution of a compressor is controlled on the basis of a target radiator pressure, and a valve circuit of the outdoor expansion valve is controlled on the basis of a target heat absorber temperature to execute a dehumidifying and heating mode. In this case, when a valve position of the outdoor expansion valve is large, a refrigerant flow rate into the outdoor heat exchanger increases, and when the valve position is small, the refrigerant flow rate into the heat absorber increases.

In a case where such a dehumidifying and heating mode is executed on conditions that an outdoor air temperature is low, a requested heating capability increases, and hence a temperature and a pressure of a radiator have to be increased, but under the low-temperature outdoor air, a temperature of the heat absorber is also easy to lower. Therefore, when the number of revolution of the compressor is increased to improve the heating capability, even in a case where the valve position of the outdoor expansion valve is increased, an amount of the refrigerant into the heat absorber is excessively large, a dehumidifying capability becomes excessive, and further, frost is generated in the heat absorber.

Therefore, from the reason that frost formation to the heat absorber is avoided, the number of revolution of the compressor cannot be increased, and there is the problem that the heating capability in a vehicle interior runs short. This problem also applies to a case where the refrigerant absorbs heat only in the heat absorber during dehumidifying and heating.

The present invention has been developed to solve such a conventional technical problem, and an object thereof is to provide a vehicle air conditioner in which in a dehumidifying and heating mode, a heating capability by a radiator can be acquired while avoiding frost formation to a heat absorber.

Means for Solving the Problems

A vehicle air conditioner of the present invention includes a compressor which compresses a refrigerant; a radiator which lets the refrigerant radiate heat to heat air to be supplied to a vehicle interior; a heat absorber which lets the refrigerant absorb heat to cool the air to be supplied to the vehicle interior; an outdoor heat exchanger disposed outside the vehicle interior to let the refrigerant absorb heat; and control means, and executes a dehumidifying and heating mode in which the control means lets the refrigerant discharged from the compressor radiate heat in the radiator, decompresses the refrigerant by which heat has been radiated and then absorbs heat in the heat absorber and the outdoor heat exchanger or only in the heat absorber, thereby heating the vehicle interior while dehumidifying the vehicle interior, the vehicle air conditioner including an injection circuit which distributes a part of the refrigerant flowing out from the radiator to return the part of the refrigerant to the compressor, the vehicle air conditioner being characterized in that in the dehumidifying and heating mode, the control means operates the injection circuit, and returns the refrigerant to the compressor in a case where there is established one of a predetermined heating capability shortage condition on which a heating capability runs short, a predetermined dehumidifying capability excess condition on which a dehumidifying capability becomes excessive and a predetermined low outdoor air temperature startup condition on which startup is made at a low outdoor air temperature or any combination of the conditions.

The vehicle air conditioner of the invention of claim 2 is characterized in that in the above invention, the control means judges that the heating capability shortage condition is established, in a case where after elapse of predetermined time from the startup, a difference between a target radiator temperature and a temperature of the radiator increases and a difference between a target radiator pressure and a pressure of the radiator increases.

The vehicle air conditioner of the invention of claim 3 is characterized in that in the invention of claim 1, the control means judges that the dehumidifying capability excess condition is established, in a case where a difference between a target radiator temperature and a temperature of the radiator decreases, a difference between a target radiator pressure and a pressure of the radiator decreases, and the temperature of the heat absorber lowers.

The vehicle air conditioner of the invention of claim 4 is characterized in that in the invention of claim 2 or claim 3, the control means stops the operation of the injection circuit, in a case where the difference between the target radiator temperature and the temperature of the radiator decreases, the difference between the target radiator pressure and the pressure of the radiator decreases, and a difference between a target heat absorber temperature and a temperature of the heat absorber decreases.

The vehicle air conditioner of the invention of claim 5 is characterized in that in the invention of claim 1, the control means judges that the low outdoor air temperature startup condition is established, in a case where within predetermined time from the startup, an outdoor air temperature is low and a target outlet temperature to the vehicle interior is high.

The vehicle air conditioner of the invention of claim 6 is characterized in that in the above invention, the control means stops the operation of the injection circuit in a case where the outdoor air temperature rises and the target outlet temperature lowers.

The vehicle air conditioner of the invention of claim 7 is characterized in that the above respective inventions, the vehicle air conditioner includes an outdoor expansion valve which decompresses the refrigerant flowing into the outdoor heat exchanger, and the refrigerant is distributed before this outdoor expansion valve, decompressed and flows through the heat absorber, and the control means controls a number of revolution of the compressor on the basis of the target radiator pressure of the radiator, and controls a valve position of the outdoor expansion valve on the basis of the target heat absorber temperature of the heat absorber.

Advantageous Effect of the Invention

According to the present invention, a vehicle air conditioner includes a compressor which compresses a refrigerant; a radiator which lets the refrigerant radiate heat to heat air to be supplied to a vehicle interior; a heat absorber which lets the refrigerant absorb heat to cool the air to be supplied to the vehicle interior; an outdoor heat exchanger disposed outside the vehicle interior to let the refrigerant absorb heat; and control means, and executes a dehumidifying and heating mode in which the control means lets the refrigerant discharged from the compressor radiate heat in the radiator, decompresses the refrigerant by which heat has been radiated and then absorbs heat in the heat absorber and the outdoor heat exchanger or only in the heat absorber, thereby heating the vehicle interior while dehumidifying the vehicle interior. The vehicle air conditioner includes an injection circuit which distributes a part of the refrigerant flowing out from the radiator to return the part of the refrigerant to the compressor. In the dehumidifying and heating mode, the control means operates the injection circuit, and returns the refrigerant to the compressor in a case where there is established one of a predetermined heating capability shortage condition on which a heating capability runs short, a predetermined dehumidifying capability excess condition on which a dehumidifying capability becomes excessive and a predetermined low outdoor air temperature startup condition on which startup is made at a low outdoor air temperature or any combination of the conditions. Therefore, in a case where the heating capability of the radiator runs short, a part of the refrigerant flowing out from the radiator can be returned to the compressor by the injection circuit, and the heating capability by the radiator can be improved. On the other hand, by the distribution to the injection circuit, a refrigerant flow rate to the heat absorber decreases, and hence frost formation of the heat absorber is prevented or inhibited.

Additionally, in a case where the dehumidifying capability by the heat absorber becomes excessive, the injection circuit is operated, thereby improving the heating capability of the radiator, and hence, a number of revolution of the compressor decreases. In consequence, the refrigerant flow rate to the heat absorber also decreases, and hence, the dehumidifying capability can be inhibited, and additionally, the frost formation can be prevented or inhibited.

Additionally, when the dehumidifying and heating mode is performed in a situation where the outdoor air temperature is low, the number of revolution of the compressor also increases to improve the heating capability, but when the injection circuit is operated, the improvement of the heating capability by the radiator is further achieved and the refrigerant flow rate to the heat absorber similarly decreases, and hence the frost formation of the heat absorber can be prevented or inhibited.

Consequently, according to the present invention, in the dehumidifying and heating mode, the heating capability by the radiator can be acquired while appropriately controlling temperatures of the radiator and the heat absorber and avoiding the frost formation to the heat absorber. Additionally, an excessive refrigerant flow rate to the heat absorber can be avoided, and hence, it is possible to remove an evaporation capability control valve disposed in an outlet of the heat absorber.

In this case, as in the invention of claim 2, the control means judges that the heating capability shortage condition is established, in a case where after elapse of predetermined time from the startup, a difference between a target radiator temperature and the temperature of the radiator increases, and a difference between a target radiator pressure and a pressure of the radiator increases, and hence, it is possible to precisely judge that the heating capability of the radiator runs short.

Additionally, as in the invention of claim 3, the control means judges that the dehumidifying capability excess condition is established, in a case where a difference between a target radiator temperature and the temperature of the radiator decreases, a difference between a target radiator pressure and a pressure of the radiator decreases, and the temperature of the heat absorber lowers, and hence, it is possible to precisely judge that the dehumidifying capability of the heat absorber is excessive.

Consequently, as in the invention of claim 4, the control means stops the operation of the injection circuit, in a case where the difference between the target radiator temperature and the temperature of the radiator decreases, the difference between the target radiator pressure and the pressure of the radiator decreases, and a difference between a target heat absorber temperature and a temperature of the heat absorber decreases. In consequence, it is possible to judge that a shortage state of the heating capability of the radiator and an excess state of the dehumidifying capability of the heat absorber are eliminated and that the dehumidifying capability of the heat absorber runs short, thereby stopping the operation of the injection circuit.

Additionally, as in the invention of claim 5, the control means judges that the low outdoor air temperature startup condition is established, in a case where within predetermined time from the startup, an outdoor air temperature is low and a target outlet temperature to the vehicle interior is high, and hence, it is possible to precisely judge the startup at the low outdoor air temperature.

Furthermore, as in the invention of claim 6, the control means stops the operation of the injection circuit in a case where the outdoor air temperature rises and the target outlet temperature lowers, and hence, it is possible to precisely judge elimination of a low outdoor air temperature environment, thereby stopping the operation of the injection circuit.

In particular, as in the invention of claim 7, the vehicle air conditioner includes an outdoor expansion valve which decompresses the refrigerant flowing into the outdoor heat exchanger, and the refrigerant is distributed before the outdoor expansion valve, decompressed, and then flows through the heat absorber, and additionally, the control means controls a number of revolution of the compressor on the basis of the target radiator pressure of the radiator, and controls a valve position of the outdoor expansion valve on the basis of the target heat absorber temperature of the heat absorber, and in this case, the above inventions are remarkably effective.

MODE FOR CARRYING OUT THE INVENTION

Hereinafter, embodiments of the present invention will be described in detail with reference to the drawings.

Figure 1:
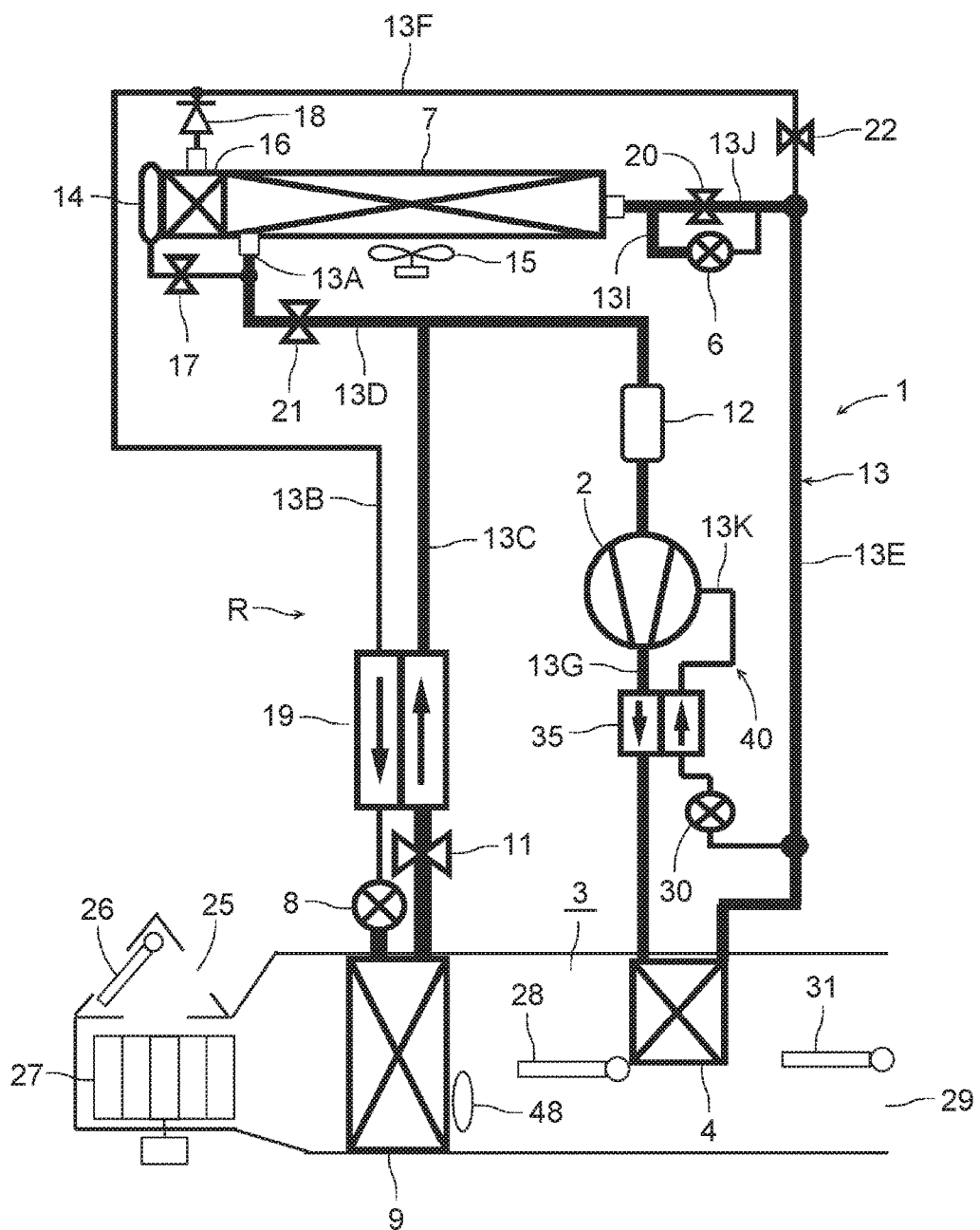
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is also driven by the power of the battery. That is, in the electric car in which heating cannot be performed by waste heat of the engine, the vehicle air conditioner 1 of the embodiment selectively executes respective operation modes of heating, dehumidifying and heating, dehumidifying and cooling, cooling, and the like by a heat pump operation in which a refrigerant circuit is used.

It is to be noted that the vehicle is not limited to the electric car, and the present invention is also effective for a so-called hybrid car in which the engine is used together with the electric motor for the running, and is, needless to say, further applicable also to a usual car which runs by the engine.

The vehicle air conditioner 1 of the embodiment performs air conditioning (heating, cooling, dehumidifying, and ventilation) in a vehicle interior of the electric car, and there are successively connected, by a refrigerant pipe 13, an electric compressor 2 which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, so that a refrigerant circuit R is constituted. It is to be noted that in the outdoor heat exchanger 7, an outdoor blower 15 is disposed which performs the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and bypasses the outdoor expansion valve 6 to pass the refrigerant.

Additionally, the refrigerant pipe 13E immediately after the pipe is extended out from the radiator 4 (before the pipe is branched into refrigerant pipes 13F and 13I) is branched, and this branched refrigerant pipe 13K communicates to be connected to the middle of compression by the compressor 2 via an injection expansion valve 30 constituted of an electric valve for injection control. Further, the refrigerant pipe 13K between an outlet side of the injection expansion valve 30 and the compressor 2 is disposed in a heat exchange relation with a refrigerant pipe 13G positioned on a discharge side of the compressor 2, and both the pipes constitute a discharge side heat exchanger 35.

The refrigerant pipe 13K, the injection expansion valve 30 and the discharge side heat exchanger 35 constitute an injection circuit 40. The injection circuit 40 is a circuit which distributes a part of the refrigerant flowing out from the radiator 4 to return the part of the refrigerant to the middle of the compression by the compressor 2 (gas injection). Additionally, in a case where the injection circuit 40 operates, the injection expansion valve 30 opens, and the part of the refrigerant flowing out from the radiator 4 is distributed to the refrigerant pipe 13K.

The injection expansion valve 30 decompresses the refrigerant flowing into the refrigerant pipe 13K, and then the refrigerant flows into the discharge side heat exchanger 35. The refrigerant flowing into the discharge side heat exchanger 35 is discharged from the compressor 2 to the refrigerant pipe 13G, performs heat exchange with the refrigerant before flowing into the radiator 4, and absorbs heat from the refrigerant flowing through the refrigerant pipe 13G to evaporate. In the discharge side heat exchanger 35, the refrigerant distributed to the refrigerant pipe 13K evaporates, whereby the gas injection into the compressor 2 is performed.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to adjust a degree of flow of the indoor air or the outdoor air through the radiator 4. Further, in the air flow passage 3 on an air downstream side of the radiator 4, there is formed each outlet (represented by an outlet 29 in FIG. 1) of foot (air is blown out toward each foot of a passenger), vent (the air is blown out toward an upper part of a passenger's body) or defroster (the air is blown out to an inner surface of windshield glass), and in the outlet 29, an outlet changing damper 31 is disposed to perform changing control of blowing of the air from each outlet mentioned above.

Figure 2:
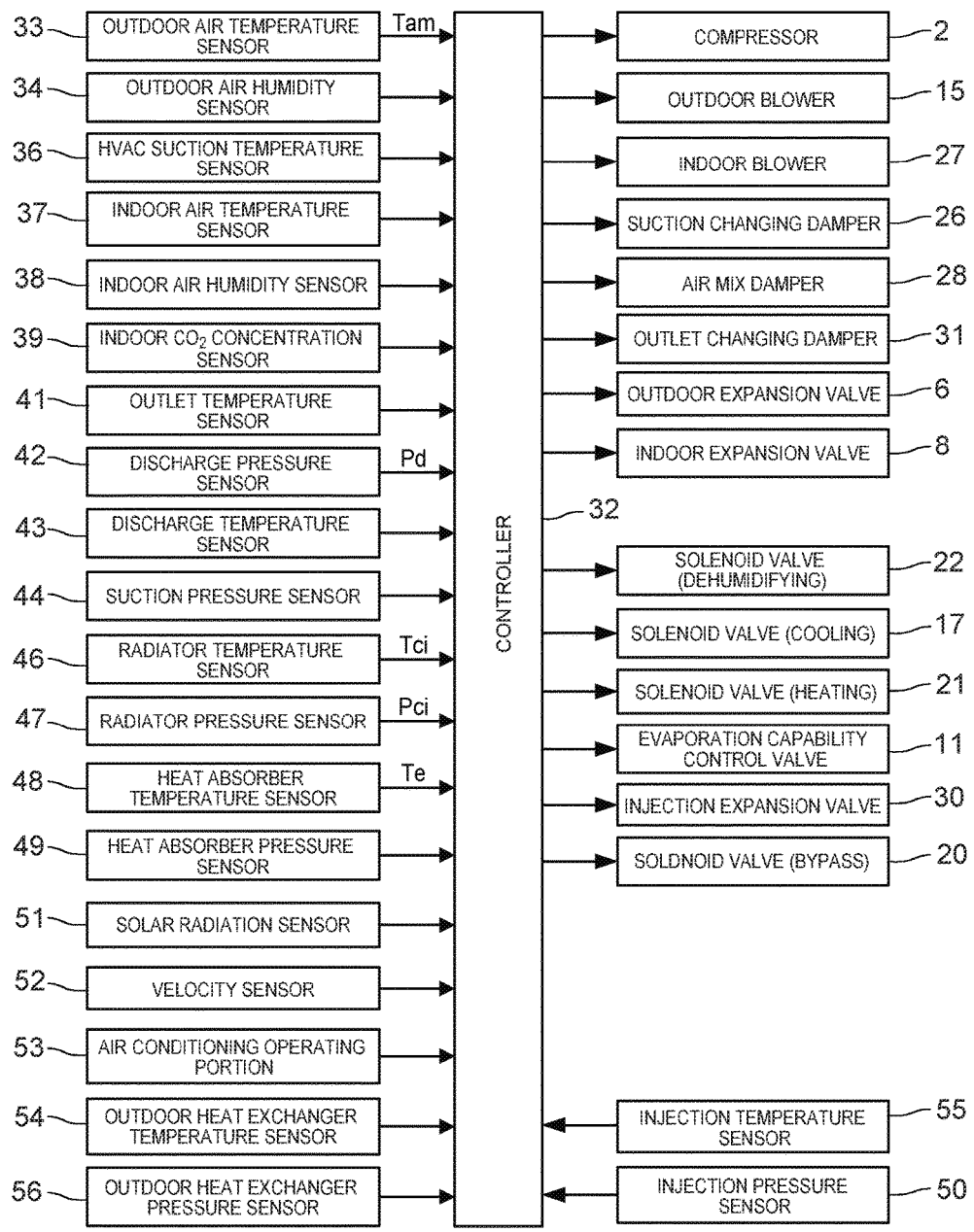
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air which has just flowed out from the radiator 4 or the temperature of the radiator 4 itself or the temperature of the air which has just been heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the air which has just flowed out from the heat absorber 9 or the temperature of the heat absorber 9 itself or the temperature of the air which has just been cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of an injection pressure sensor 50 which detects a pressure or an injection refrigerant flowing into the refrigerant pipe 13K of the injection circuit 40 and flowing through the discharge side heat exchanger 35 to return to the middle of the compression by the compressor 2, and an injection temperature sensor 55 which detects a temperature of the injection refrigerant.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the injection expansion valve 30, and the evaporation capability control valve 11. Further, the controller 32 controls these components on the basis of the outputs of the respective sensors and the setting input by the air conditioning operating portion 53.

Next, an operation of the vehicle air conditioner 1 of the embodiment having the abovementioned constitution will be described. The controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 (auto) or a manual operation to the air conditioning operating portion 53, the controller 32 opens the solenoid valve 21 and closes the solenoid valve 17, the solenoid valve 22 and the solenoid valve 20. Furthermore, the compressor 2 and the respective blowers 15 and 27 are operated, and the air mix damper 28 has a state where the air blown out from the indoor blower 27 is passed through the radiator 4. In consequence, a high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then a part of the refrigerant is distributed to the refrigerant pipe 13K of the injection circuit 40, and mainly flows through the refrigerant pipe 13E to reach the outdoor expansion valve 6. It is to be noted that a function and an operation of the injection circuit 40 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

In the embodiment, the controller 32 controls a number of revolution of the compressor 2 on the basis of a refrigerant pressure Pci of the radiator 4 which is detected by the radiator pressure sensor 47 (or the discharge pressure sensor 42) and a target radiator pressure PCO, also controls a valve position of the outdoor expansion valve 6 on the basis of a volume of air to be passed through the radiator 4 and an after-mentioned target outlet temperature, and controls a subcool degree of the refrigerant in the outlet of the radiator 4. It is to be noted that the valve position of the outdoor expansion valve 6 may be controlled on the basis of a temperature of the radiator 4 or an outdoor air temperature in place of or in addition to the above conditions.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the number of revolution of the compressor 2 on the basis of the refrigerant pressure Pci of the radiator 4 (a high pressure of the refrigerant circuit R) which is detected by the radiator pressure sensor 47 (or the discharge pressure sensor 42) and the target radiator pressure PCO, and also controls the valve position of the outdoor expansion valve 6 on the basis of the temperature of the heat absorber 9 (a heat absorber temperature Te) which is detected by the heat absorber temperature sensor 48 and a target heat absorber temperature TEO which is a target value of the temperature of the heat absorber 9. It is to be noted that control of the gas injection by the injection circuit 40 in this dehumidifying and heating mode will be described later.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position).

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (the radiator pressure Pci) of the radiator 4. It is to be noted that also in this dehumidifying and cooling mode, the gas injection by the injection circuit 40 is not performed, and hence the injection expansion valve 30 is shut off (the shut off position).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling), and the air mix damper 28 has a state where the air is not passed through the radiator 4. In consequence, the high-temperature high-pressure gas refrigerant discharged from the compressor 2 flows into the radiator 4 through the discharge side heat exchanger 35. The air in the air flow passage 3 is not passed through the radiator 4, the refrigerant therefore only passes here, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position).

(6) Changing Control of Operation Mode

At startup, the controller 32 selects the operation mode on the basis of an outdoor air temperature Tam detected by the outdoor air temperature sensor 33 and a target outlet temperature TAO. Additionally, after the startup, the controller selects and changes the above respective operation modes in accordance with a change of an environment or setting conditions of the outdoor air temperature Tam, the target outlet temperature TAO or the like. In this case, the controller 32 basically shifts from the heating mode to the dehumidifying and heating mode or from the dehumidifying and heating mode to the heating mode, shifts from the dehumidifying and heating mode to the dehumidifying and cooling mode or from the dehumidifying and cooling mode to the dehumidifying and heating mode, and shifts from the dehumidifying and cooling mode to the cooling mode or from the cooling mode to the dehumidifying and cooling mode, but when the controller shifts from the dehumidifying and heating mode to the dehumidifying and cooling mode and shifts from the dehumidifying and cooling mode to the dehumidifying and heating mode, the controller shifts via the internal cycle mode. Additionally, the controller might shift from the cooling mode to the internal cycle mode or from the internal cycle mode to the cooling mode.

(7) Gas Injection by Injection Circuit

Figure 3:
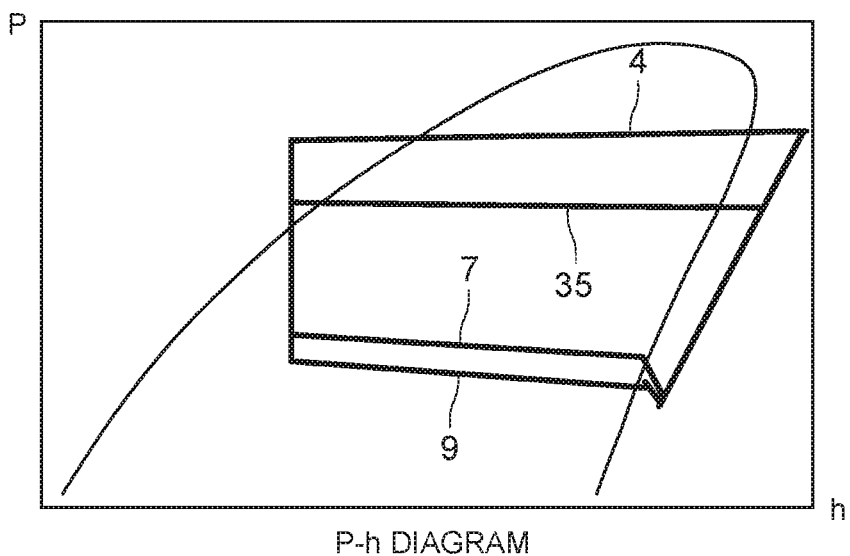
FIG. 3 is a P-h diagram of the vehicle air conditioner of FIG. 1 during injection.
Figure 4:
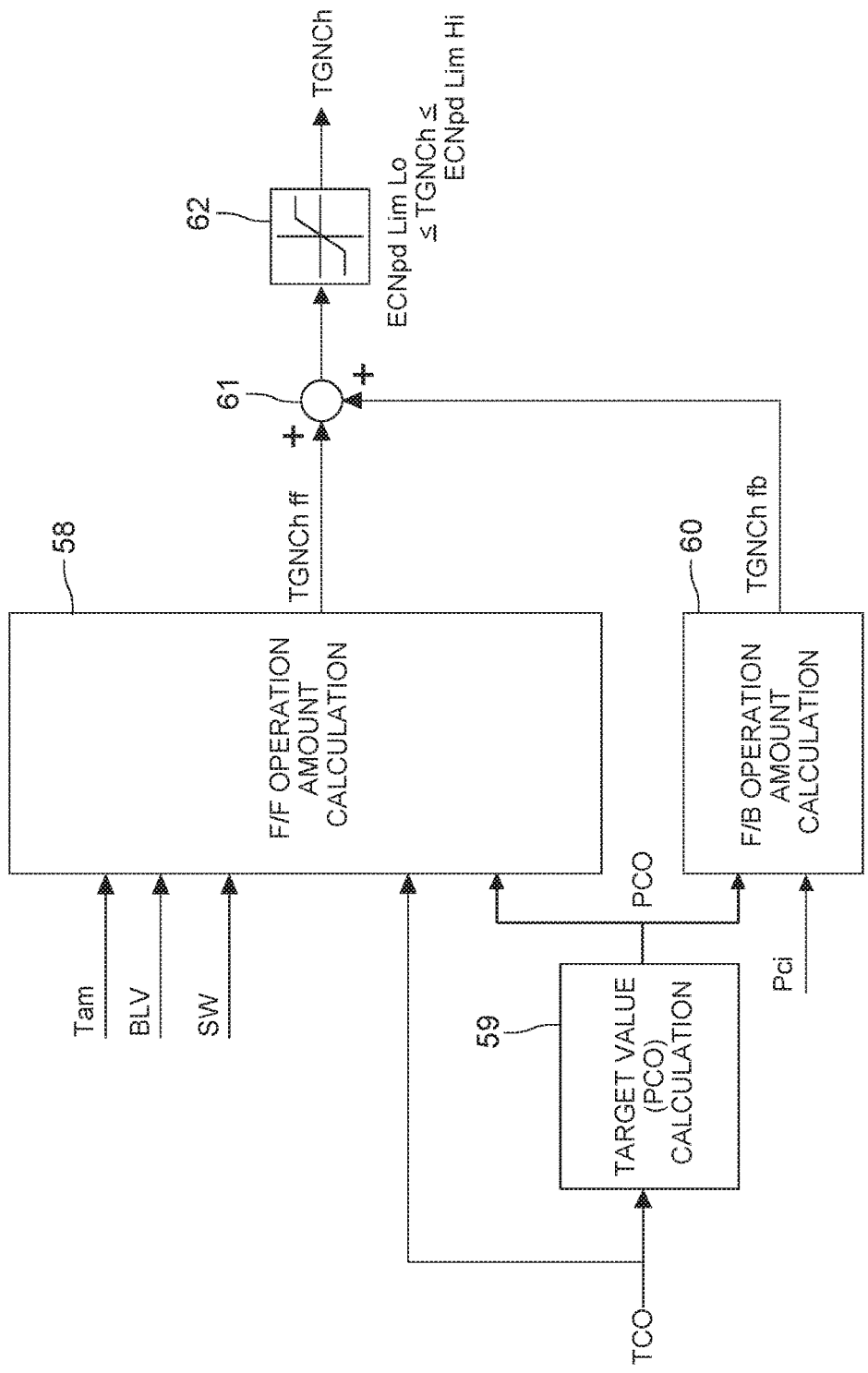
FIG. 4 is a control block diagram concerning compressor control in a dehumidifying and heating mode by the controller of FIG. 2.

Next, gas injection in the above dehumidifying and heating mode will be described. FIG. 3 shows a P-h diagram of the vehicle air conditioner 1 of the present invention in the dehumidifying and heating mode. When the injection expansion valve 30 is open, the refrigerant, which flows out from the radiator 4 to enter the refrigerant pipe 13E and is then distributed to flow into the refrigerant pipe 13K of the injection circuit 40, is decompressed by the injection expansion valve 30, enters the discharge side heat exchanger 35 in which the refrigerant performs heat exchange with the refrigerant discharged from the compressor 2 (the refrigerant discharged from the compressor 2 before flowing into the radiator 4), and absorbs heat to evaporate. The evaporated gas refrigerant then returns to the middle of the compression by the compressor 2, is further compressed together with the refrigerant sucked from the accumulator 12 and compressed, and is then discharged from the compressor 2 to the refrigerant pipe 13G again.

In FIG. 3, a line denoted with 35 indicates the refrigerant which is evaporated by the discharge side heat exchanger 35 of the injection circuit 40 and then returned to the compressor 2. When the refrigerant is returned from the injection circuit 40 to the middle of the compression by the compressor 2, an amount of the refrigerant to be discharged from the compressor 2 increases, and hence the heating capability in the radiator 4 improves. Additionally, the refrigerant is distributed to the injection circuit 40. Thus, a refrigerant flow rate of the outdoor heat exchanger 7 or the heat absorber 9 decreases, and hence, temperature drop of the heat absorber 9 and the dehumidifying capability in the heat absorber 9 are suppressed.

On the other hand, when a liquid refrigerant returns to the compressor 2, liquid compression is caused, and hence the refrigerant to be returned from the injection circuit 40 to the compressor 2 has to be a gas. Therefore, the controller 32 monitors a superheat degree of the refrigerant toward the middle of the compression by the compressor 2 from the pressure and the temperature of the refrigerant after the discharge side heat exchanger 35 which are detected by the injection pressure sensor 50 and the injection temperature sensor 55, respectively, and the controller controls the valve position of the injection expansion valve 30 so that a predetermined superheat degree is applied in the heat exchange with the discharged refrigerant. However, in the embodiment, the discharge side heat exchanger 35 performs heat exchange between the remarkably high-temperature refrigerant discharged from the compressor 2 before flowing into the radiator 4 and the refrigerant flowing through the injection circuit 40, and hence a large heat exchange amount can be obtained. Therefore, even when the valve position of the injection expansion valve 30 is increased to increase an injection amount, the refrigerant can sufficiently evaporate in the discharge side heat exchanger 35, and a required superheat degree can be obtained.

In consequence, as compared with a conventional case where heat exchange is performed between the refrigerant after the radiator and the injection refrigerant, a gas injection amount to the compressor 2 can sufficiently be acquired, and the amount of the refrigerant to be discharged from the compressor 2 can be increased to achieve the improvement of the heating capability.

Next, there will be described a control block of the compressor 2, the outdoor expansion valve 6 and the injection expansion valve 30 by the controller 32 in the dehumidifying and heating mode with reference to FIG. 4 to FIG. 9.

(8) Control of Compressor in Dehumidifying and Heating Mode

FIG. 1 is a control block diagram of the controller 32 which determines a target number of revolution (target compressor number of revolution) TGNCh of the compressor 2 for the above dehumidifying and heating mode (this also applies to the heating mode). An F/F (feedforward) control amount calculation section 58 calculates an F/F control amount TGNChff of the compressor target number of revolution, on the basis of the outdoor air temperature Tam which can be obtained from the outdoor air temperature sensor 33, a blower voltage BLV of the indoor blower 27, an air mix damper opening SW of the air mix damper 28 which can be obtained from SW=(TAO−Te)/(TH−Te), a target radiator temperature TCO which is a target value of the temperature of the radiator 4, and the target radiator pressure PCO which is a target value of the pressure of the radiator 4.

It is to be noted that TAO is the target outlet temperature which is the target value of an air temperature from the outlet 29, TH is a temperature (radiator temperature) of the radiator 4 which can be obtained from the radiator temperature sensor 46, Te is a temperature (heat absorber temperature) of the heat absorber 9 which can be obtained from the heat absorber temperature sensor 48, the air mix damper opening SW changes in a range of 0≤SW≤1, 0 indicates an air mix shut off state in which air is not passed through the radiator 4, and 1 indicates an air mix fully open state in which all the air in the air flow passage 3 is passed through the radiator 4.

Figure 5:
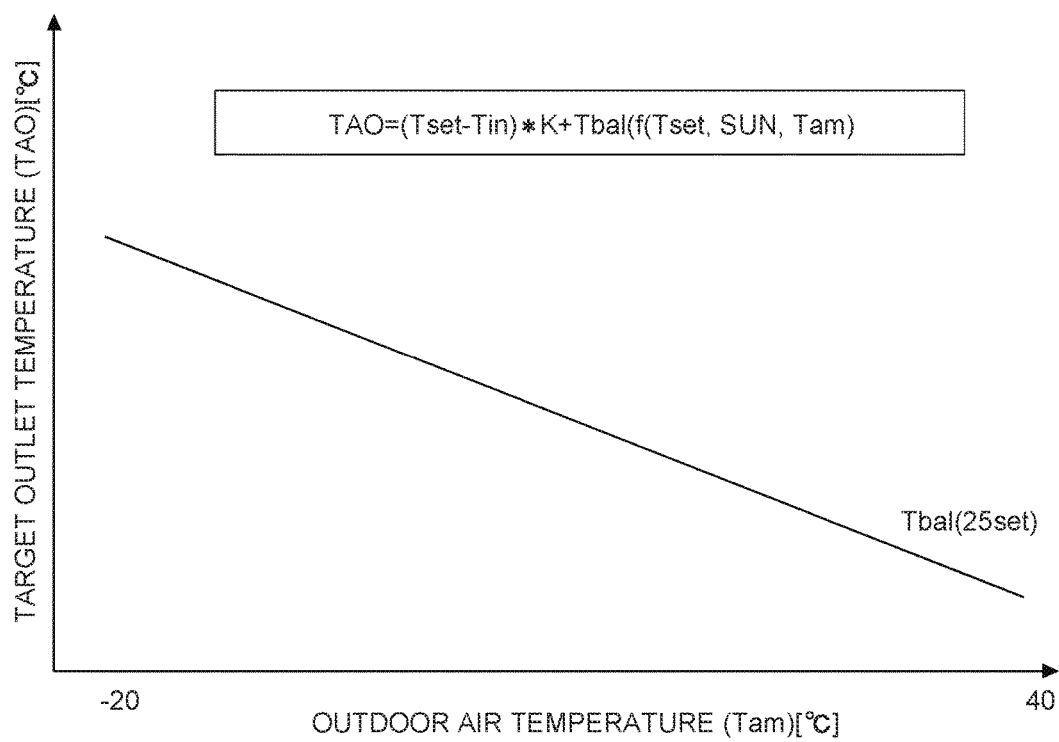
FIG. 5 is a diagram to explain determination of a target outlet temperature by the controller of FIG. 2.

Additionally, the target outlet temperature TAO is a target value of the temperature of the air to be blown out from the outlet 29 into the vehicle interior, and calculated from Equation (1) mentioned below by the controller 32.

$$TAO=(Tset-Tin) \times K+Tbal(f(Tset, SUN, Tam)) \quad (1),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes as shown in FIG. 5.

In addition, the controller 32 calculates the target radiator temperature TCO from the target outlet temperature TAO. Further, the target radiator pressure PCO is calculated by a target value calculation section 59 on the basis of the target radiator temperature TCO. Furthermore, an F/B (feedback) control amount calculation section 60 calculates an F/B control amount TGNChfb of the compressor target number of revolution on the basis of the target radiator pressure PCO and the radiator pressure Pci which is a refrigerant pressure of the radiator 4. Further, the F/F control amount TGNChff calculated by the F/F control amount calculation section 58 and the F/B control amount TGNChfb calculated by the F/B control amount calculation section 60 are added by an adder 61, limits of a controlling upper limit value and a controlling lower limit value are attached by a limit setting section 62, and then the target compressor number of revolution TGNCh is determined. In the dehumidifying and heating mode (also in the heating mode), the controller 32 controls the number of revolution of the compressor 2 on the basis of the target compressor number of revolution TGNCh.

That is, in the dehumidifying and heating mode and the heating mode in which the refrigerant radiates heat in the radiator 4 to exert a heating operation in the vehicle interior, the target compressor number of revolution TGNCh of the compressor 2 is determined on the basis of the target radiator pressure PCO (the target value of the high pressure) and the radiator pressure Pci.

(9) Control of Outdoor Expansion Valve in Dehumidifying and Heating Mode

Figure 6:
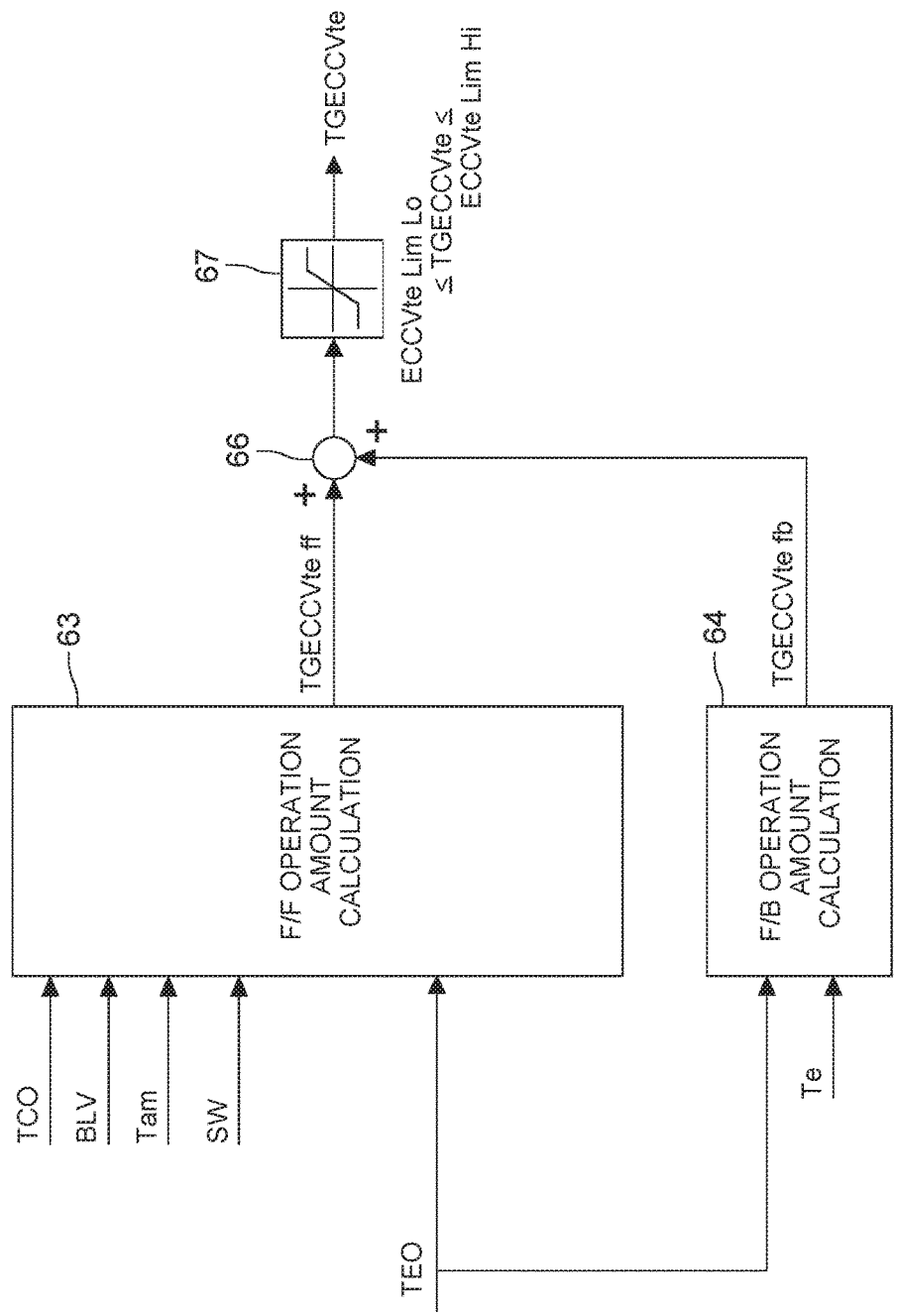
FIG. 6 is a control block diagram concerning outdoor expansion valve control in the dehumidifying and heating mode by the controller of FIG. 2.

Next, FIG. 6 is a control block diagram of the controller 32 which determines a target position (outdoor expansion valve target position) TGECCVte of the outdoor expansion valve 6 for the above dehumidifying and heating mode. An F/F control amount calculation section 63 of the controller 32 calculates an F/F control amount TGECCVteff of the outdoor expansion valve target position on the basis of the target heat absorber temperature TEO, the target radiator temperature TCO, the blower voltage BLV, the outdoor air temperature Tam, and the air mix damper opening SW.

It is to be noted that in the controller 32, there is stored a data table in which a relation between the outdoor air temperature Tam and the heat absorber temperature to obtain a required humidity in the environment of the outdoor air temperature Tam is beforehand obtained, and the target heat absorber temperature TEO is determined on the basis of this data table.

Additionally, an F/B control amount calculation section 64 calculates an F/B control amount TGECCVtefb of the outdoor expansion valve target position on the basis of the target heat absorber temperature TEO and the heat absorber temperature Te. Further, the F/F control amount TGECCVteff calculated by the F/F control amount calculation section 63 and the F/B control amount TGECCVtefb calculated by the F/B control amount calculation section 64 are added by an adder 66, limits of a controlling upper limit value and a controlling lower limit value are attached by a limit setting section 67, and then the outdoor expansion valve target position TGECCVte is determined. In the dehumidifying and heating mode, the controller 32 controls the valve position of the outdoor expansion valve 6 on the basis of the outdoor expansion valve target position TGECCVte.

That is, the controller determines the outdoor expansion valve target position TGECCVte of the outdoor expansion valve 6 on the basis of the target heat absorber temperature TEO and the heat absorber temperature Te, and controls the target valve position.

(10) Control of Injection Expansion Valve in Dehumidifying and Heating Mode

Figure 7:
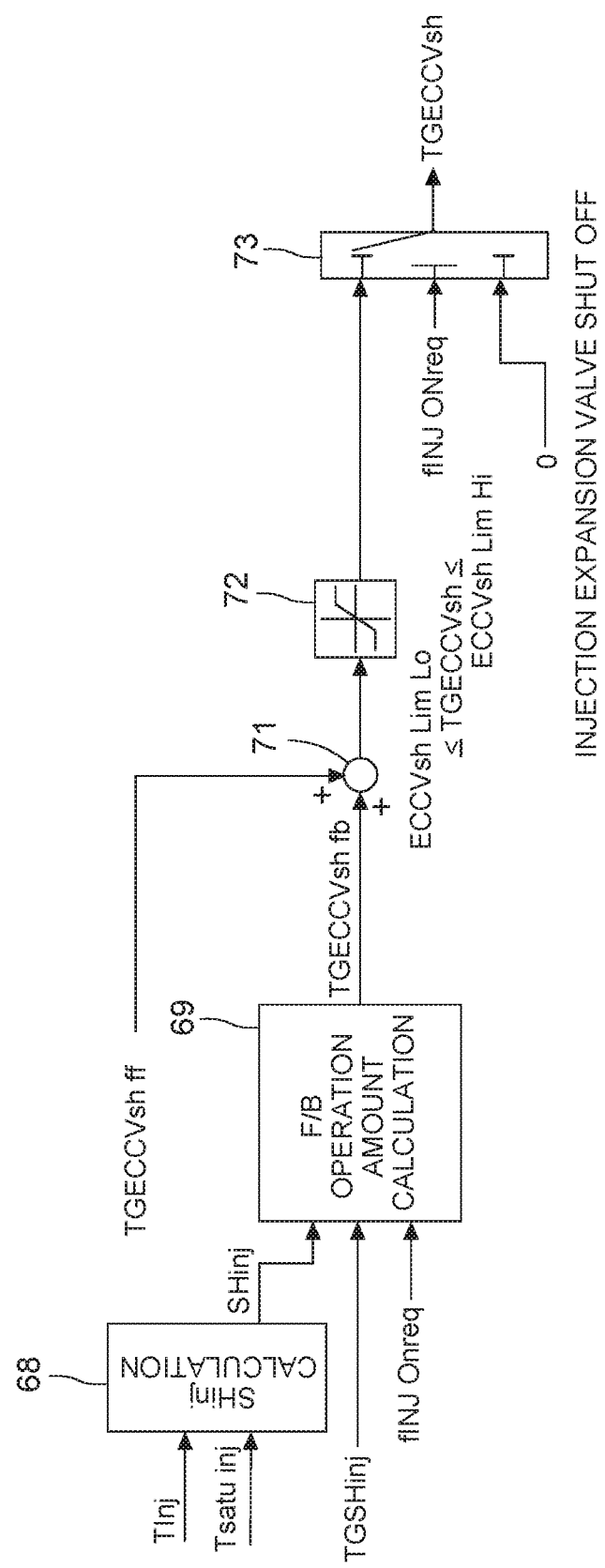
FIG. 7 is a control block diagram concerning injection expansion valve control in the dehumidifying and heating mode by the controller of FIG. 2.

Next, FIG. 7 is a control block diagram of the controller 32 which determines a target position (an injection expansion valve target position) TGECCVsh of the injection expansion valve 30 of the injection circuit 40 for the above dehumidifying and heating mode. An injection refrigerant superheat degree calculation section 68 of the controller 32 calculates a superheat degree (an injection refrigerant superheat degree) SHinj of the injection refrigerant to be returned from the injection circuit 40 to the middle of the compression by the compressor 2, on the basis of a difference between a temperature (an injection refrigerant temperature Tinj) of the injection refrigerant which is detected by the injection temperature sensor 55 and a saturation temperature Tsatuinj.

Next, an F/B control amount calculation section 69 calculates an F/B control amount TGECCVshfb of the injection expansion valve target position on the basis of the injection refrigerant superheat degree SHinj calculated by the injection refrigerant superheat degree calculation section 68, and a target value (a target injection refrigerant superheat degree TGSHinj) of the superheat degree of the injection refrigerant to be returned from the injection circuit 40 to the middle of the compression by the compressor 2. It is to be noted that a determining method of the target injection refrigerant superheat degree TGSHinj will be described later in detail. Additionally, the F/B control amount calculation section 69 operates when an after-mentioned injection request flag fINJOnreq is set to "1", and stops the calculation when the flag is set to "0" (reset).

Further, the F/B control amount TGECCVshfb calculated by the F/B control amount calculation section 69 and an F/F control amount TGECCVshff of the injection expansion valve 30 which is beforehand determined are added by an adder 71, limits of a controlling upper limit value and a controlling lower limit value are attached by a limit setting section 72, and then the control amount is input into an injection feasibility changing section 73. Into the injection feasibility changing section 73, "0" (the injection expansion valve 30 is shut off) is further input, and when the injection request flag fINJOnreq is "1" (set), the value through the limit setting section 72 is determined as the injection expansion valve target position TGECCVsh and output.

It is to be noted that the injection feasibility changing section 73 outputs "0" as the injection expansion valve target position TGECCVsh, when the injection request flag fINJOnreq is "0" (reset). That is, when the injection request flag fINJOnreq is set to "1", the controller 32 determines the injection expansion valve target position TGECCVsh of the injection expansion valve 30 on the basis of the superheat degree SHinj of the injection refrigerant and the target injection refrigerant superheat degree TGSHinj, and controls the valve position, and when the injection request flag fINJOnreq is reset to "0", the controller closes the injection expansion valve 30 (the valve position is "0" and the valve is shut off), and stops the gas injection by the injection circuit 40.

(11) Gas injection Control in Dehumidifying and Heating Mode

Figure 8:
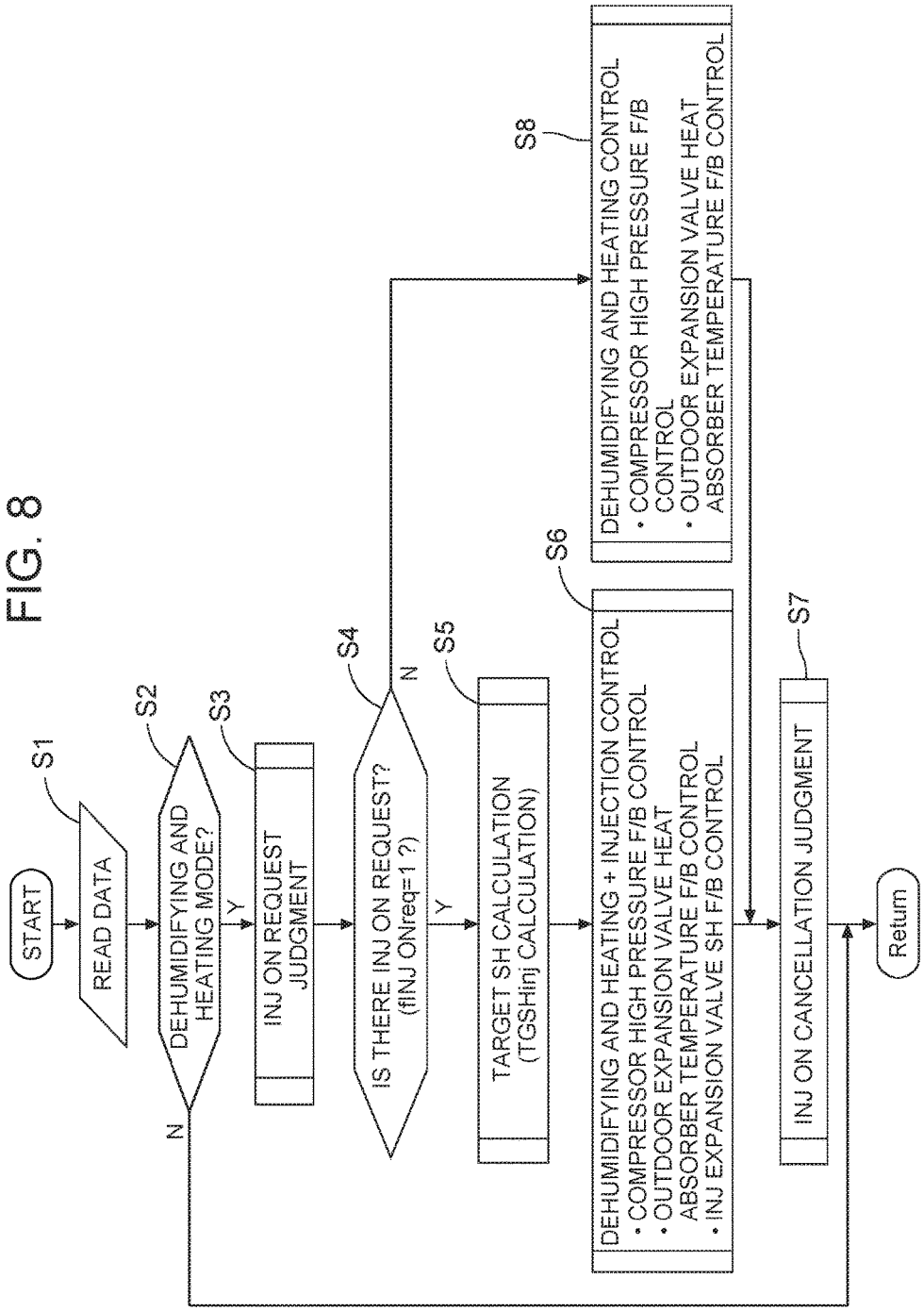
FIG. 8 is a flowchart to explain an operation of the controller of FIG. 2.

Next, specific gas injection control in the dehumidifying and heating mode by the controller 32 will be described. FIG. 8 is a flowchart to explain an operation of the controller 32 in this case. The controller 32 reads the data from each sensor in step S1 of FIG. 8, and judges whether or riot the present mode is the dehumidifying and heating mode in step S2. Furthermore, when the present mode is the dehumidifying and heating mode, the controller advances to step S3 to judge whether or not there is a gas injection request (an INJON request indicating whether or not to operate the injection circuit 40).

(11-1) Gas Injection Request Judgment

Next, the judgment of the gas injection request by the controller 32 in the step S3 will be described. In the embodiment, the controller 32 judges that there is the gas injection request (the INJON request) in a case where one of three conditions (i) to (iii) mentioned below is established, and the controller sets the injection request flag fINJOnreg mentioned above to "1" (set). That is, the conditions are as follows.

(i) Heating Capability Shortage Conditions

The heating capability shortage condition is a standard of judgment of whether or not the heating capability in the radiator 4 runs short, and in the embodiment, when all terms mentioned below are established, it is judged that the heating capability shortage condition is established:

(TCO−TH)≥A1;
(PCO−Pci)≥B1; and
Elapsed time after startup ≥t1.

That is, in a case where after the elapse of predetermined time t1 or more from the startup, a difference between the target radiator temperature TCO and the radiator temperature TH increases to a predetermined value A1 or more and a difference between the target radiator pressure PCO and the radiator pressure Pci increases to a predetermined value B1 or more, the controller 32 judges that the heating capability shortage condition is established, and sets a heating capability shortage flag fHTRlack to "1" (set). It is to be noted that the above A1 and B1 are predetermined threshold values by which it can be judged that the difference between the actual temperature or pressure of the radiator 4 and the target value increases and that the heating capability runs short. For example, A1 is five deg., and B1 is 0.2 MPa. Additionally, t1 is time for which the judgment is not performed from the startup until an operation state is stabilized, and is, for example, about 5 min.

(ii) Dehumidifying Capability Excess Condition

This dehumidifying capability excess condition is a standard of judgment of whether or not the dehumidifying capability in the heat absorber 9 becomes excessive, and in the embodiment, when all terms mentioned below are established, it is judged that the dehumidifying capability excess condition is established:

(TCO−TH)≤A2;
(PCO−Pci)≤B2; and
Te≤C2.

That is, in a case where the difference between the target radiator temperature TCO and the radiator temperature TH decreases to a predetermined value A2 or less and the difference between the target radiator pressure PCO and the radiator pressure Pci decreases to a predetermined value B2 or less and the heat absorber temperature Te lowers to a predetermined value C2 or less, the controller 32 judges that the dehumidifying capability excess condition is established, and sets a dehumidifying capability excess flag fEVAover to "1" (set). It is to be noted that the above A2 and B2 are predetermined threshold values by which it can be judged that the difference between the actual temperature or pressure of the radiator 4 and the target value decreases and that the heating capability suffices. For example, A2 is 2 deg., and B2 is 0.05 MPa, Additionally, C2 is a controlling lower limit value to prevent the frost formation to the heat absorber 9, and is, for example, about +1° C.

(iii) Low Outdoor Air Temperature Startup Condition

This outdoor air temperature startup condition is a standard of judgment of whether or not the startup is made at a low outdoor air temperature, and in the embodiment, when all terms mentioned below are established, it is judged that the low outdoor air temperature startup condition is established:

Tam <T1;
TAO >TA1; and
Elapsed time after startup <t1.

That is, in a case where before the elapse of predetermined time tl from the startup, the outdoor air temperature Tam is lower than a predetermined value T1 and the target outlet temperature TAO to the vehicle interior is higher than a predetermined value TA1, the controller 32 judges that the low outdoor air temperature startup condition is established, and sets a low outdoor air temperature startup flag fHeatUP to "1" (set). It is to be noted that the above T1 and TA1 are predetermined threshold values by which it can be judged that the outdoor air temperature is low and a high value is requested for a temperature of hot air to be blown out to the vehicle interior. For example, T1 is +5° C., and TA1 is +60° C. Additionally, T1 is, for example, about 5 min. in the same manner as described above.

In the embodiment, as described above, in the step S3, the controller 32 judges all of the heating capability shortage condition, the dehumidifying capability excess condition and the low outdoor air temperature startup condition, and in a case where one of the conditions is established and one of the heating capability shortage flag fHTRlack, the dehumidifying capability excess flag fEVAover and the low outdoor air temperature startup flag fHeatUP is set ("1"), the controller sets the injection request flag fINJOnreq ("1").

Next, in step S4, the controller 32 judges whether or not the injection request flag fINJOnreq is set and there is the gas injection request (the INJON request), and in a case where the injection request flag fINJOnreq is set, the controller advances to step S5 to calculate the target injection refrigerant superheat degree TGSHinj.

Figure 9:
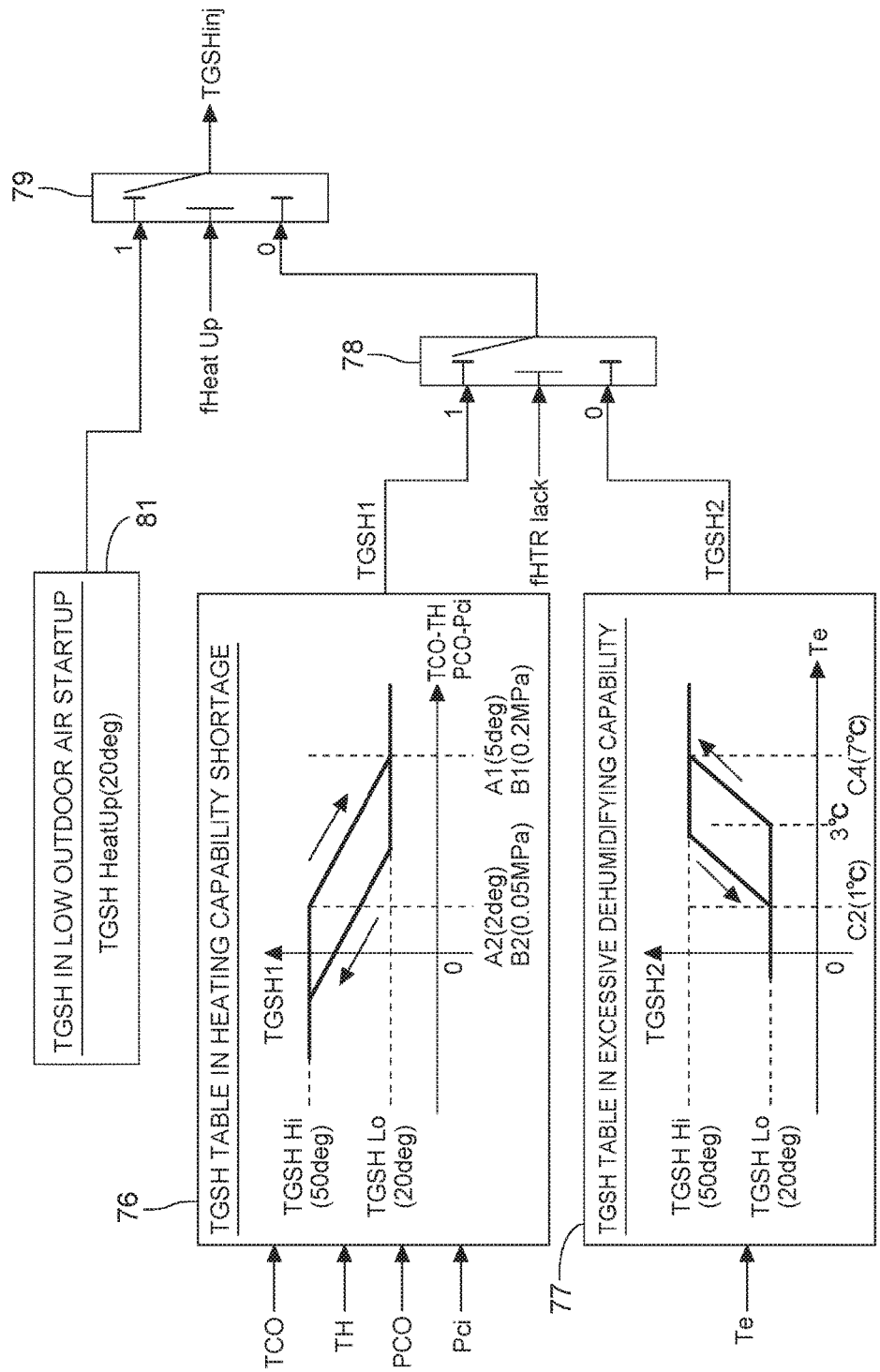
FIG. 9 is a control block diagram concerning determination of a target injection refrigerant superheat degree of an injection circuit in the dehumidifying and heating mode by the controller of FIG. 2.

FIG. 9 is a control block diagram concerning determination of the target injection refrigerant superheat degree TGSHinj by the controller 32 in this case. A heating capability shortage TGSH calculation section 76 of the controller 32 determines a target injection refrigerant superheat degree TGSH1 in heating capability shortage, on the basis of a heating capability shortage TGSH table (FIG. 9) determined beforehand. In this case, the heating capability shortage TGSH calculation section 76 defines the target injection refrigerant superheat degree TGSH1 in heating capability shortage, as a predetermined high value (TGSHHi: e.g., 50 deg), in a case where a difference (TCO-TH) between the target radiator temperature TCO and the radiator temperature TH is A2 (2 deg) or less as described above, and a difference (PCO-Pci) between the target radiator pressure PCO and the radiator pressure Pci is B2 (0.05 MPa) or less as described above. When this refrigerant superheat degree is high, it is meant that the gas injection amount decreases.

Additionally, in a case where TCO-TH is the abovementioned A1 (5 deg) or more and PCO-Pci is the abovementioned B1 (0.2 MPa) or more, the target injection refrigerant superheat degree TGSH1 in heating capability shortage is defined as a predetermined low value (TGSHLo: e.g., 20 degree). When this refrigerant superheat degree is low, it is meant that the gas injection amount increases.

Further, in a case where TCO-TH is between A2 and A1 and PCO-Pci is between B2 and B1, the target injection refrigerant superheat degree TGSH1 in heating capability shortage is linearly changed between TGSHHi and TGSHLo with a predetermined hysteresis.

That is, the controller 32 changes the target injection refrigerant superheat degree TGSH1 in heating capability shortage so as to decrease the gas injection amount when the difference (TCO-TH) between the target radiator temperature TCO of the radiator 4 and the radiator temperature TH and the difference (PCO-Pci) between the target radiator pressure PCO and the radiator pressure Pci are small, and so as to increase the gas injection amount when the differences are large.

Additionally, a dehumidifying capability excess TGSH calculation section 77 of the controller 32 determines a target injection refrigerant superheat degree TGSH2 in dehumidifying capability excess, on the basis of a TGSH table in dehumidifying capability excess (FIG. 9) determined beforehand. In this case, the dehumidifying capability excess TGSH calculation section 77 defines the target injection refrigerant superheat degree TGSH2 in dehumidifying capability excess as the above TGSHLo, in a case where the heat absorber temperature Te is the abovementioned C2 (+1° C.) or less.

Additionally, in a case where the heat absorber temperature Te is a predetermined high value C4 (e.g., +7° C.) or more, the target injection refrigerant superheat degree TGSH2 in dehumidifying capability excess is defined as the above TGSHHi. Further, in a case where Te is between C2 and C4, the target injection refrigerant superheat degree TGSH2 in dehumidifying capability excess is linearly changed between TGSHLo and TGSHHi with a predetermined hysteresis.

That is, the controller 32 changes the target injection refrigerant superheat degree TGSH2 in dehumidifying capability excess so as to increase the gas injection amount when the heat absorber temperature Te of the heat absorber 9 is low and so as to decrease the gas injection amount when the temperature is high.

The target injection refrigerant superheat degree TGSH1 in heating capability shortage determined by the heating capability shortage TGSH calculation section 76 and the target injection refrigerant superheat degree TGSH2 in dehumidifying capability excess determined by the dehumidifying capability excess TGSH calculation section 77 are input into a TGSH first changing section 78. The TGSH first changing section 78 outputs the target injection refrigerant superheat degree TGSH1 in heating capability shortage in a case where the heating capability shortage flag fHTRlack mentioned above is set ("1"), and the section outputs the target injection refrigerant superheat degree TGSH2 in dehumidifying capability excess in a case where the flag is reset ("0") (therefore, it is presumed at this point of time that the dehumidifying capability excess flag fEVAover is set), and each superheat degree is input into a TGSH second changing section 79.

Further into the TGSH second changing section 79, there is input a target injection refrigerant superheat degree TGSHHeatUp in low outdoor air temperature startup which is determined by a low outdoor air temperature TGSH calculation section 81. It is to be noted that at the startup, the gas injection amount is to be increased, and hence, in the embodiment, the target injection refrigerant superheat degree TGSHHeatUp in low outdoor air temperature startup is fixed to 20 deg. Further, the TGSH second changing section 79 outputs the target injection refrigerant superheat degree TGSHHeatUp in low outdoor air temperature startup (20 degree) in a case where the low outdoor air temperature startup flag fHeatUP mentioned above is set ("1"), and the section outputs the target injection refrigerant superheat degree TGSH1 in heating capability shortage or the target injection refrigerant superheat degree TGSH2 in dehumidifying capability excess, and each degree is calculated as the target injection refrigerant superheat degree TGSHinj.

Further, in step S6, the controller 32 executes the dehumidifying and heating mode in which the injection circuit 40 is operated. That is, as described with reference to FIG. 4, the controller determines the target compressor number of revolution TGNCh of the compressor 2 on the basis of the target radiator pressure PCO (the target value of the high pressure) and the radiator pressure Pci (the high pressure), feedback-controls the number of revolution of the compressor 2, determines the outdoor expansion valve target position TGECCVte of the outdoor expansion valve 6 on the basis of the target heat absorber temperature TEO and the heat absorber temperature Te as described with reference to FIG. 6, and feedback-controls the valve position of the outdoor expansion valve 6. Further, the controller determines the injection expansion valve target position TGECCVsh of the injection expansion valve 30 on the basis of the target injection refrigerant superheat degree TGSHinj determined in FIG. 9 as described with reference to FIG. 7, and feedback-controls the valve position of the injection expansion valve 30, to control the gas injection amount to the middle of the compression by the compressor 2.

It is to be noted that in the embodiment, when the gas injection request is judged, the controller judges all of three conditions of the heating capability shortage condition, the dehumidifying capability excess condition and the low outdoor air temperature startup condition, but the present invention is not limited to this embodiment, and one of the conditions or any combination of the conditions may be judged.

(11-2) Gas Injection Request Cancellation Judgment

Next, in step S7, the controller 32 judges whether or not a cancellation (to stop the operation of the injection circuit 40) condition of the gas injection request (the INJON request) is established. Next, the judgment of the gas injection request cancellation by the controller 32 in the step S7 will be described. In the embodiment, the controller 32 judges the gas injection request cancellation (INJON cancellation) in a case where one of two conditions (iv) and (v) mentioned below is established, and resets the injection request flag fINJOnreq mentioned above to "0" (reset). That is, the flag is reset as follows.

(iv) Outdoor Air Temperature Rise Condition

This outdoor air temperature rise condition is a standard of judgment of whether or not the outdoor air temperature rises and is out from a low outdoor air temperature environment, and in the embodiment, when all terms mentioned below are established, it is judged that the outdoor air temperature rise condition is established:

Tam>T2; and
TAO<TA2.

That is, in a case where the outdoor air temperature Tam is higher than a predetermined value T2 and the target outlet temperature TAO to the vehicle interior is lower than a predetermined value TA2, the controller 32 judges that the outdoor air temperature rise condition is established, and sets an outdoor air temperature rise flag fTamUp to "1" (set). It is to be noted that the above T2 and TA2 are predetermined threshold values by which it can be judged that the outdoor air temperature is high and the temperature of the hot air to be blown out to the vehicle interior also lowers. For example, T2 is +15° C., and TA2 is +50° C.

(v) Dehumidifying Capability Shortage Condition

This dehumidifying capability shortage condition is a standard of judgment of whether or not the dehumidifying capability in the heat absorber 9 runs short, and in the embodiment, when all terms mentioned below are established, it is judged that the dehumidifying capability shortage condition is established:

(TCO−TH)≤A2;
(PCO−Pci)≤B2; and
(TEO−Te)≤C3.

That is, in a case where the difference between the target radiator temperature TCO and the radiator temperature TH decreases to the above predetermined value A2 or less and the difference between the target radiator pressure PCO and the radiator pressure Pci decreases to the above predetermined value B2 or less and the difference (TEO-Te) between the target heat absorber temperature TEO and the heat absorber temperature Te is smaller than a predetermined value C3, the controller 32 judges that the dehumidifying capability shortage condition is established, and sets a dehumidifying capability shortage flag fEVAlack to "1" (set). It is to be noted that C3 is a predetermined threshold value by which it can be judged that the temperature of the heat absorber 9 is insufficient (the heat absorber temperature Te rises), and is, for example, −1 deg.

In the embodiment, as described above, in the step S7, the controller 32 judges all of the outdoor air temperature rise condition and the dehumidifying capability shortage condition, and resets the injection request flag fINJOnreq ("0") in a case where one of the conditions is established and one of the outdoor air temperature rise flag fTamUp and the dehumidifying capability shortage flag fEVAlack is set ("1").

It is to be noted that in the embodiment, when the gas injection request cancellation is judged, all of two conditions of the outdoor air temperature rise condition and the dehumidifying capability shortage condition are judged, but the present invention is not limited to the embodiment, and one of the conditions may be judged.

In consequence, the controller 32 advances from the step S4 to step S8. In the step S8, the controller executes the dehumidifying and heating mode in which the injection circuit 40 is stopped. That is, as described with reference to FIG. 4, the controller determines the target compressor number of revolution TGNCh of the compressor 2 on the basis of the target radiator pressure PCO (the target value of the high pressure) and the radiator pressure Pci (the high pressure), feedback-controls the number of revolution of the compressor 2, determines of the outdoor expansion valve target position TGECCVte of the outdoor expansion valve 6 on the basis of the target heat absorber temperature TEO and the heat absorber temperature Te as described with reference to FIG. 6, and feedback-controls the valve position of the outdoor expansion valve 6.

As described above in detail, in the present invention, in the vehicle air conditioner 1 including the injection circuit 40 which distributes a part of the refrigerant flowing out from the radiator 4 to return the part of the refrigerant to the compressor 2, the controller 32 operates the injection circuit 40 and returns the refrigerant to the compressor 2 in the case where there is established a predetermined heating capability shortage condition that the heating capability runs short, a predetermined dehumidifying capability excess condition on which the dehumidifying capability becomes excessive, or a predetermined low outdoor air temperature startup condition on which the startup is made at the low outdoor air temperature, in the dehumidifying and heating mode. Therefore, in a case where the heating capability of the radiator 4 runs short, the injection circuit 40 can return the part of the refrigerant flowing out from the radiator 4 to the middle of the compression by the compressor 2, and improve the heating capability by the radiator 4. On the other hand, by the distribution to the injection circuit 40, the refrigerant flow rate to the heat absorber 9 decreases, and hence the frost formation of the heat absorber 9 is prevented or inhibited.

Additionally, in a case where the dehumidifying capability by the heat absorber 9 becomes excessive, the injection circuit 40 is operated, thereby improving the heating capability of the radiator 4, and hence, the number of revolution of the compressor 2 also decreases. In consequence, the refrigerant flow rate to the heat absorber 9 also decreases, and hence the dehumidifying capability can be inhibited, and additionally, the frost formation is also prevented or inhibited.

Additionally, when the dehumidifying and heating mode is performed in the situation where the outdoor air temperature is low, the number of revolution of the compressor 2 also increases to improve the heating capability, but when the injection circuit 40 is operated, the improvement of the heating capability by the radiator 4 can further be achieved, the refrigerant flow rate to the heat absorber 9 similarly decreases, and hence, the frost formation of the heat absorber 9 can be prevented or inhibited.

Consequently, according to the present invention, in the dehumidifying and heating mode, the heating capability by the radiator 4 can be acquired while appropriately controlling the temperatures of the radiator 4 and the heat absorber 9 and avoiding the frost formation to the heat absorber 9. Additionally, the excessive refrigerant flow rate to the heat absorber 9 can be avoided, and hence, it is possible to remove the evaporation capability control valve 11 disposed in the outlet of the heat absorber.

Additionally, the present invention is effective for a case where the heating capability by the radiator 4 runs short in a so-called B/L mode of the outlet of the vent and foot, and an effective range of the B/L mode in the dehumidifying and heating mode is enlarged, and hence, it is possible to expect the effect that the abovementioned internal cycle mode can be abolished.

In this case, the controller 32 judges that the heating capability shortage condition is established, in the case where after the elapse of the predetermined time from the startup, the difference between the target radiator temperature TCO and the radiator temperature TH of the radiator 4 increases and the difference between the target radiator pressure PCO and the radiator pressure Pci of the radiator 4 increases, and hence, it is possible to precisely judge that the heating capability of the radiator 4 runs short.

Additionally, the controller 32 judges that the dehumidifying capability excess condition is established, in the case where the difference between the target radiator temperature TCO and the radiator temperature TH of the radiator 4 decreases, the difference between the target radiator pressure PCO and the radiator pressure Pci of the radiator 4 decreases, and the heat absorber temperature Te of the heat absorber 9 lowers, and hence, it is possible to precisely judge that the dehumidifying capability of the heat absorber 9 is excessive.

Further, as in these inventions, the controller 32 stops the operation of the injection circuit 40, in the case where the difference between the target radiator temperature TCO and the radiator temperature TH of the radiator 4 decreases, the difference between the target radiator pressure PCO and the radiator pressure Pci of the radiator 4 decreases, and the difference between the target heat absorber temperature TEO and the heat absorber temperature Te of the heat absorber 9 decreases. In consequence, it is possible to judge that the shortage state of the heating capability of the radiator 4 and the excess state of the dehumidifying capability of the heat absorber 9 are eliminated and that conversely, the dehumidifying capability of the heat absorber 9 runs short, thereby stopping the operation of the injection circuit 40.

Additionally, the controller 32 judges that the low outdoor air temperature startup condition is established, in the case where within the predetermined time from the startup, the outdoor air temperature Tam is low and the target outlet temperature TAO to the vehicle interior is high, and hence, it is possible to precisely judge the startup at the low outdoor air temperature.

Further, the controller 32 stops the operation of the injection circuit 40 in the case where the outdoor air temperature Tam rises and the target outlet temperature TAO lowers, and hence, it is possible to precisely judge the elimination of the low outdoor air temperature environment, thereby stopping the operation of the injection circuit 40.

Consequently, in particular, as in the embodiment, the vehicle air conditioner includes the outdoor expansion valve 6 which decompresses the refrigerant flowing into the outdoor heat exchanger 7, and the refrigerant is distributed before the outdoor expansion valve 6, decompressed, and then flows through the heat absorber 9, and additionally, the controller 32 controls the number of revolution of the compressor 2 on the basis of the target radiator pressure PCO of the radiator 4, and controls the valve position of the outdoor expansion valve 6 on the basis of the target heat absorber temperature TEO of the heat absorber 9, and in this case, the present invention is remarkably effective.

It is to be noted that in the embodiment, the present invention is applied to the vehicle air conditioner 1 which changes and executes the respective operation modes of the heating mode, the dehumidifying and heating mode, the dehumidifying and cooling mode and the cooling mode, but the present invention is not limited to the embodiment, and the present invention is also effective for a vehicle air conditioner which only performs the dehumidifying and heating mode.

Additionally, the constitution or each numeric value of the refrigerant circuit R described in the above embodiment are not limited to the embodiment, and needless to say, they can be changed without departing from the gist of the present invention.

DESCRIPTION OF REFERENCE NUMERAL

1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
26 suction changing damper
27 indoor blower (blower fan)
28 air mix damper
32 controller (control means)
30 injection expansion valve
40 injection circuit
35 discharge side heat exchanger
R refrigerant circuit

The invention claimed is:

1. A vehicle air conditioner comprising:
a compressor which compresses a refrigerant;
a radiator which lets the refrigerant radiate heat to heat air to be supplied to a vehicle interior;
a heat absorber which lets the refrigerant absorb heat to cool the air to be supplied to the vehicle interior;
an outdoor heat exchanger disposed outside the vehicle interior to let the refrigerant absorb heat; and
control means,
the vehicle air conditioner executing a dehumidifying and heating mode in which the control means is configured to let the refrigerant discharged from the compressor radiate heat in the radiator, decompress the refrigerant by which heat has been radiated and then absorb heat in the heat absorber and the outdoor heat exchanger or only in the heat absorber, thereby heating the vehicle interior while dehumidifying the vehicle interior,
the vehicle air conditioner comprising an injection circuit which distributes a part of the refrigerant flowing out from the radiator to return the part of the refrigerant to the compressor,
wherein in the dehumidifying and heating mode, the control means is configured to operate the injection circuit, and return the refrigerant to the compressor in a case where there is established one of a predetermined heating capability shortage condition on which a heating capability runs short, a predetermined dehumidifying capability excess condition on which a dehumidifying capability becomes excessive and a predetermined low outdoor air temperature startup condition on which startup is made at a low outdoor air temperature, or any combination of the conditions,
wherein the control means is configured to judge that the dehumidifying capability excess condition is established, in a case where a difference between a target radiator temperature and a temperature of the radiator decreases, a difference between a target radiator pressure and a pressure of the radiator decreases, and the temperature of the heat absorber lowers.

2. The vehicle air conditioner according to claim 1,
wherein the control means is configured to judge that the heating capability shortage condition is established, in a case where after elapse of predetermined time from the startup, a difference between a target radiator temperature and a temperature of the radiator increases and a difference between a target radiator pressure and a pressure of the radiator increases.

3. The vehicle air conditioner according to claim 1,
wherein the control means is configured to stop the operation of the injection circuit, in a case where the difference between the target radiator temperature and the temperature of the radiator decreases, the difference between the target radiator pressure and the pressure of the radiator decreases, and a difference between a target heat absorber temperature and a temperature of the heat absorber decreases.

4. The vehicle air conditioner according to claim 1, wherein the control means is configured to judge that the low outdoor air temperature startup condition is established, in a case where within predetermined time from the startup, an outdoor air temperature is low and a target outlet temperature to the vehicle interior is high.

5. The vehicle air conditioner according to claim 4, wherein the control means is configured to stop the operation of the injection circuit in a case where the outdoor air temperature rises and the target outlet temperature lowers.

6. The vehicle air conditioner according to claim 1, which comprises an outdoor expansion valve which decompresses the refrigerant flowing into the outdoor heat exchanger,
wherein the refrigerant is distributed before the outdoor expansion valve, decompressed and flows through the heat absorber, and
the control means is configured to control a number of revolutions of the compressor on a basis of the target radiator pressure of the radiator, and control a valve position of the outdoor expansion valve on the basis of the target heat absorber temperature of the heat absorber.

7. A vehicle air conditioner comprising:
a compressor which compresses a refrigerant;
a radiator which lets the refrigerant radiate heat to heat air to be supplied to a vehicle interior;
a heat absorber which lets the refrigerant absorb heat to cool the air to be supplied to the vehicle interior;
an outdoor heat exchanger disposed outside the vehicle interior to let the refrigerant absorb heat; and
control means,
the vehicle air conditioner executing a dehumidifying and heating mode in which the control means is configured to let the refrigerant discharged from the compressor radiate heat in the radiator, decompress the refrigerant by which heat has been radiated and then absorb heat in the heat absorber and the outdoor heat exchanger or only in the heat absorber, thereby heating the vehicle interior while dehumidifying the vehicle interior,
the vehicle air conditioner comprising an injection circuit which distributes a part of the refrigerant flowing out from the radiator to return the part of the refrigerant to the compressor,
wherein in the dehumidifying and heating mode, the control means is configured to operate the injection circuit, and return the refrigerant to the compressor in a case where there is established one of a predetermined heating capability shortage condition on which a heating capability runs short, a predetermined dehumidifying capability excess condition on which a dehumidifying capability becomes excessive and a predetermined low outdoor air temperature startup condition on which startup is made at a low outdoor air temperature, or any combination of the conditions,
wherein the control means is configured to judge that the heating capability shortage condition is established, in a case where after elapse of predetermined time from the startup, a difference between a target radiator temperature and a temperature of the radiator increases and a difference between a target radiator pressure and a pressure of the radiator increases,
wherein the control means is configured to stop the operation of the injection circuit, in a case where the difference between the target radiator temperature and the temperature of the radiator decreases, the difference between the target radiator pressure and the pressure of the radiator decreases, and a difference between a target heat absorber temperature and a temperature of the heat absorber decreases.

\* \* \* \* \*